United States Patent [19]
Wilson et al.

[11] Patent Number: 5,775,704
[45] Date of Patent: Jul. 7, 1998

[54] REVERSE LEVER ACTUATED KEYLESS CHUCK

[75] Inventors: Larry Wilson, Belton, S.C.; Glenn L. Salpaka, Evansville, Ind.; Valerie Owens, Townville, S.C.

[73] Assignee: Power Tool Holders Incorporated, Wilmington, Del.

[21] Appl. No.: 670,193

[22] Filed: Jun. 22, 1996

[51] Int. Cl.$^6$ .................................................. B23B 31/12
[52] U.S. Cl. ........................... 279/62; 279/140; 279/902
[58] Field of Search ............................ 279/60–65, 140, 279/902

[56] References Cited

U.S. PATENT DOCUMENTS

| | | | |
|---|---|---|---|
| 2,458,626 | 1/1949 | Norige | 279/62 |
| 3,000,642 | 9/1961 | Kawasaki | 279/62 |
| 3,311,384 | 3/1967 | Kawasaki | 279/62 |
| 5,125,673 | 6/1992 | Huff et al. | 279/60 |
| 5,215,317 | 6/1993 | Jordan et al. | 279/140 |
| 5,261,679 | 11/1993 | Nakamura | 279/140 |
| 5,322,303 | 6/1994 | Nakamura | 279/62 |
| 5,499,828 | 3/1996 | Salpaka et al. | 279/62 |
| 5,615,899 | 4/1997 | Sakamaki | 279/140 |

*Primary Examiner*—Steven C. Bishop
*Attorney, Agent, or Firm*—Dority & Manning

[57] ABSTRACT

A chuck for use with a manual or powered driver having a rotatable drive shaft includes a body and a primary gripping mechanism utilizing a three-jaw assembly actuated by a nut driven by a sleeve. The chuck includes a supplemental tightening mechanism. The supplemental tightening mechanism includes at least one L-shaped lever having a portion disposed between the nut and nose section of the body of the chuck. The nut can include a passage through which the lever passes. The lever bar will push off a hardened washer disposed against the body and thus force the nut forward to produce an enhanced gripping force on the tool through the jaws. The supplemental tightening mechanism can further include a detent to restrain relative rotation between the nut and the sleeve. The detent can include a groove formed in the nut and a resilient retaining clip held by the sleeve to selectively engage the groove.

19 Claims, 4 Drawing Sheets

REVERSE LEVER ACTUATED KEYLESS CHUCK

BACKGROUND OF THE INVENTION

The present invention relates generally to chucks for use with hand or power drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the drivers also may be used with such tools as screwdrivers, nut drivers, burrs, mounted grinding stones, and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft of a driver. The chucks are configured so that rotation of an internally threaded tightening ring or nut that mates with external threads on the jaws forces the jaws into gripping relationship with respect to the cylindrical shank of a tool when rotated in one direction, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated by reference herein.

In a keyless chuck, it is desirable to obtain a sufficient holding force within the tightening capability of a normal user. With many of the jaw type chucks as described above, one means of enhancing holding force on a tool has been to use relatively fine threads on the jaws that mate with the nut to enhance the amount of force that can be generated. This solution has the disadvantage that a relatively large number of turns of the nut are necessary to span the range of diameters of tools that can be accepted by the chucks. In addition, friction-reducing means such as bearings have been utilized to further enhance the amount of gripping force that can be generated.

Further, it may be desirable to enhance the gripping force obtainable by a normal user above and beyond what is normally obtainable with currently available three-jaw chucks. One example of such a chuck is disclosed in application Ser. No. 08/206,115 entitled "Lever Bar Keyless Chuck", commonly assigned to the present assignee, and whose entire disclosure is incorporated by reference herein. Another example of such a chuck is disclosed in application Ser. No. 08/479,468 entitled "Lever Actuated Keyless Chuck", commonly assigned to the present assignee, and whose entire disclosure is incorporated by reference herein.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide a keyless chuck that is capable of enhanced gripping forces.

It is another object of the present invention to provide a keyless chuck that allows for easy and quick change of tool size throughout a wide range of tool shank diameters.

It is another object of the present invention to provide a keyless chuck that provides dual stage or supplemental tightening of the jaws.

It is a further object of the present invention to provide a chuck that allows for easy and quick release of the tool.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a chuck for use with a manual or powered driver having a rotatable drive shaft includes a generally cylindrical body member having a nose section and a tail section. The tail section is adapted to mate with the drive shaft of the driver, and the nose section has an axial bore formed therein and a plurality of angularly disposed passageways formed therethrough and intersecting the axial bore. The chuck includes a plurality of jaws slidably positioned in each of the angularly disposed passageways. Each of the jaws has a jaw face formed on one side thereof for engaging a tool to be held between the jaw faces, and threads formed on the opposite side of the jaw faces for engagement with a threaded nut.

The chuck further includes a nut rotatably mounted with respect to the body member and in engagement with the threads on the jaws. The chuck also includes a sleeve member in driving engagement with the nut so that when the sleeve member is rotated with respect to the body member, the jaws will be moved thereby. The chuck is configured so that the sleeve member is selectively rotatable with respect to the nut over a limited arc of relative rotation. In particular, a plurality of detents is provided to govern when the selective relative rotation occurs.

The chuck includes a supplemental tightening mechanism for increasing the gripping force applied by the jaws to the tool held by the chuck. The supplemental tightening mechanism includes a plurality of lever members. Each lever member is desirably L-shaped, and thus has a longer leg disposed transversely relative to a shorter leg. One portion of each of the lever members extends through a pathway formed through the nut. The shorter leg is carried in a foot recess portion of the pathway. Another portion of each of the lever members extends between the nut and the nose section of the body member. A free end of each of the lever members is carried in a recess formed in the sleeve to permit the lever member to be canted therein. The pathway through the nut is also configured to permit the lever member to be canted therein.

A portion of the lever member extends through an opening formed in an actuation ring that is disposed above the recess formed in the sleeve. The actuation ring is held nonrotatably with respect to the sleeve. The supplemental tightening mechanism also can include a hardened washer carried in a thrust ring portion of the body and disposed to engage the shorter leg of the lever member when the lever member is canted in the pathway formed in the nut. When the supplemental tightening mechanism is actuated by rotation of the sleeve relative to the nut, the lever members will become canted so as to force the nut toward the nose section and thereby cause the jaws to produce an enhanced tightening force on the tool. Moreover, the detents are configured and disposed to restrain the sleeve member against rotation with respect to the nut once the supplemental tightening mechanism is activated to produce the enhanced gripping force on the tool held in the chuck.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 1:
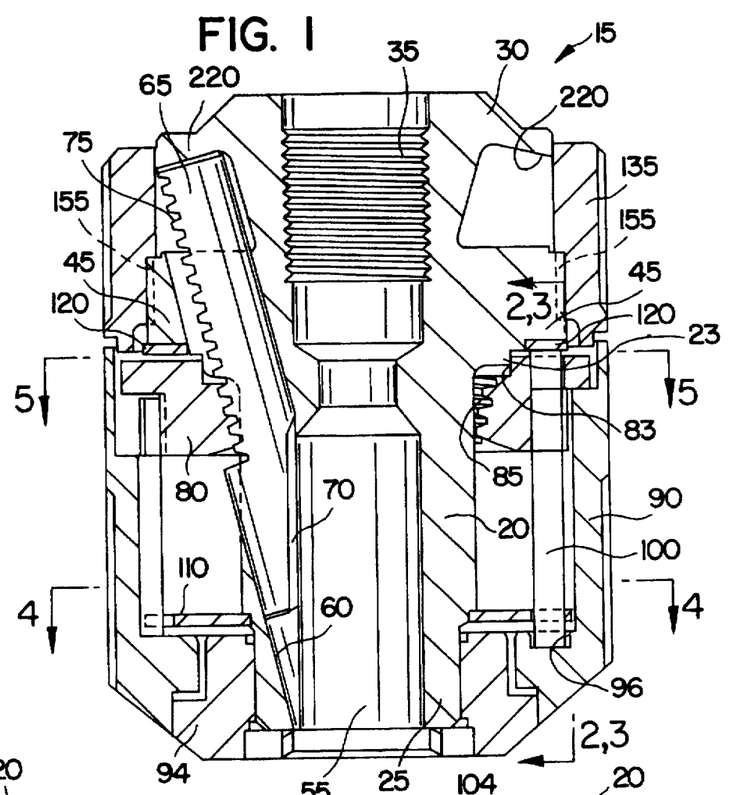
FIG. 1 is a cross-sectional view of a chuck in accordance with an embodiment of the present invention.
Figure 5:
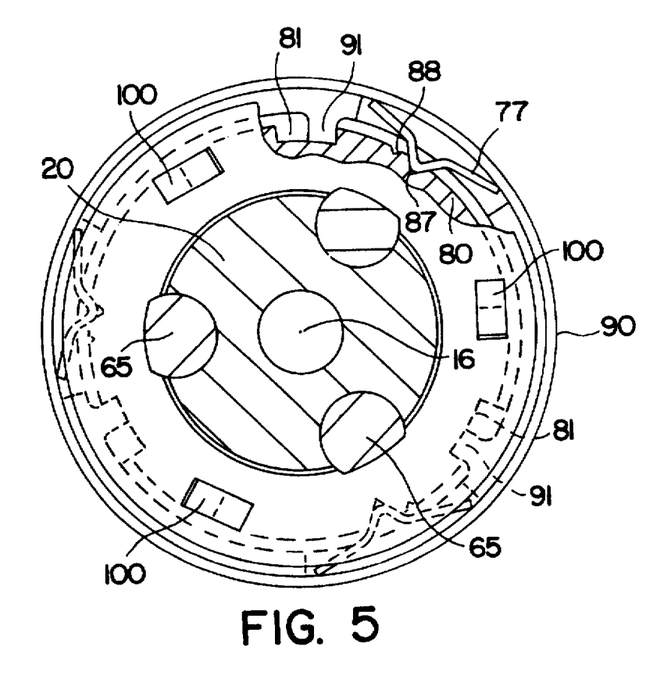
FIG. 5 is a cross-sectional view taken along the arrows 5, 5 of FIG. 1.
Figure 9:
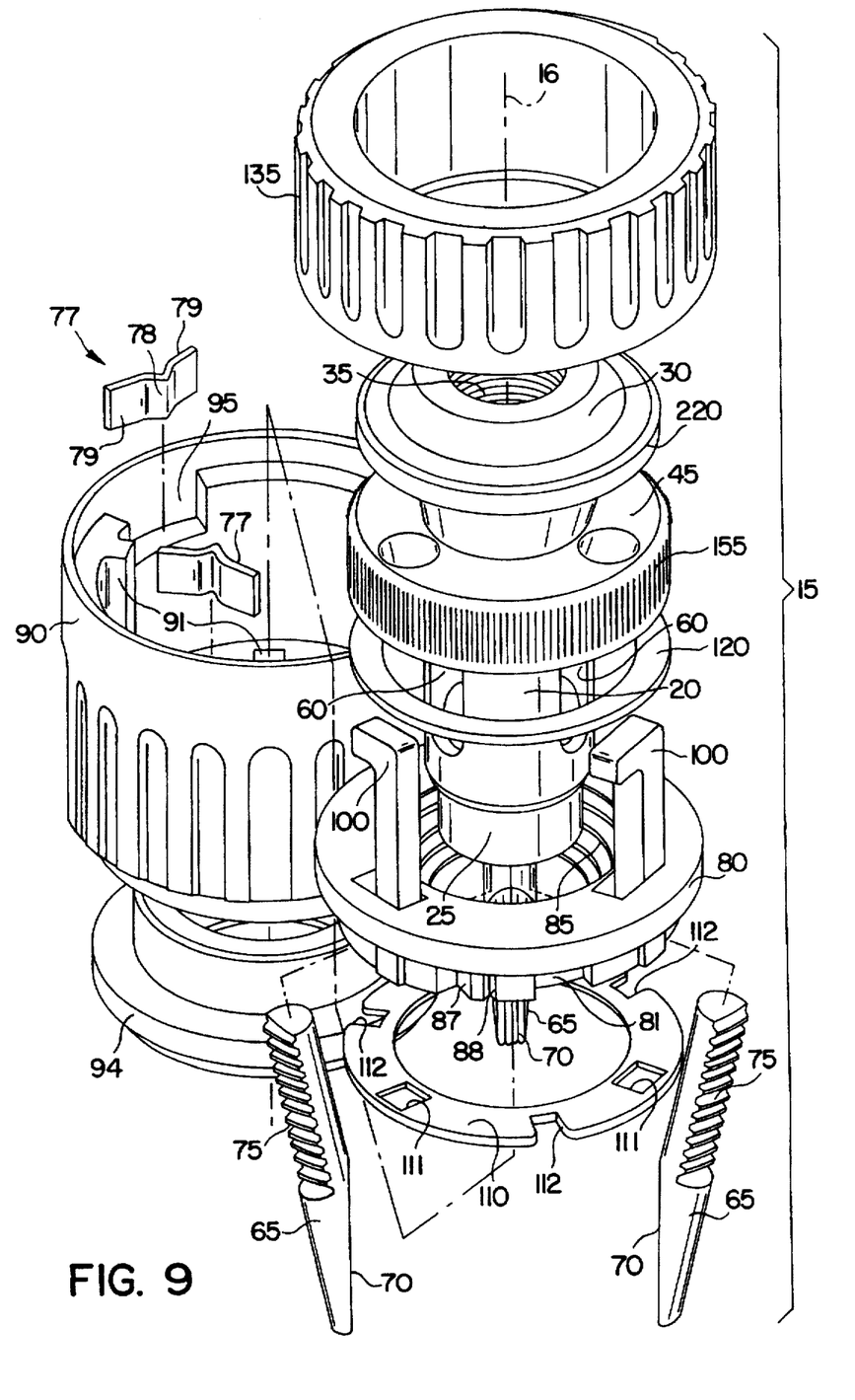
FIG. 9 is an elevated perspective assembly view of the chuck shown in FIGS. 1–8.

Referring to FIGS. 1 and 9, a chuck in accordance with an embodiment of the present invention is illustrated and generally designated with the numeral 15. As shown in FIGS. 5 and 9, the central longitudinal axis of chuck 15 is designated by the numeral 16 and represented in FIG. 9 by a broken line so designated. While the description herein will refer to a power drill, it should be appreciated that any suitable type of device that requires a chuck could be utilized with the chuck of the present invention.

Referring to FIGS. 1 and 9, chuck 15 includes a generally cylindrical body member 20 having a nose 10 section 25 and a tail section 30. Tail section 30 may include a threaded bore 35 for receipt of the spindle or drive shaft of a driver such as a drill. While a threaded bore is illustrated, it should be appreciated that such could be a tapered bore for attachment to a tapered spindle or any other type of attachment mechanism that would be suitable in the desired environment.

As shown in FIGS. 1 and 9, body member 20 includes a thrust ring 45 that is integral therewith. However, it should be appreciated that thrust ring 45 could be a separate component fixed on body member 20. As shown in FIG. 1, nose section 25 of body member 20 defines an axial bore 55 and a plurality of angularly disposed passageways 60 formed therein and intersecting axial bore 55. Axial bore 55 is of a size sufficient to receive the largest diameter tool, such as the shank of a drill bit, that a particular size chuck is configured to accommodate.

Figure 8:
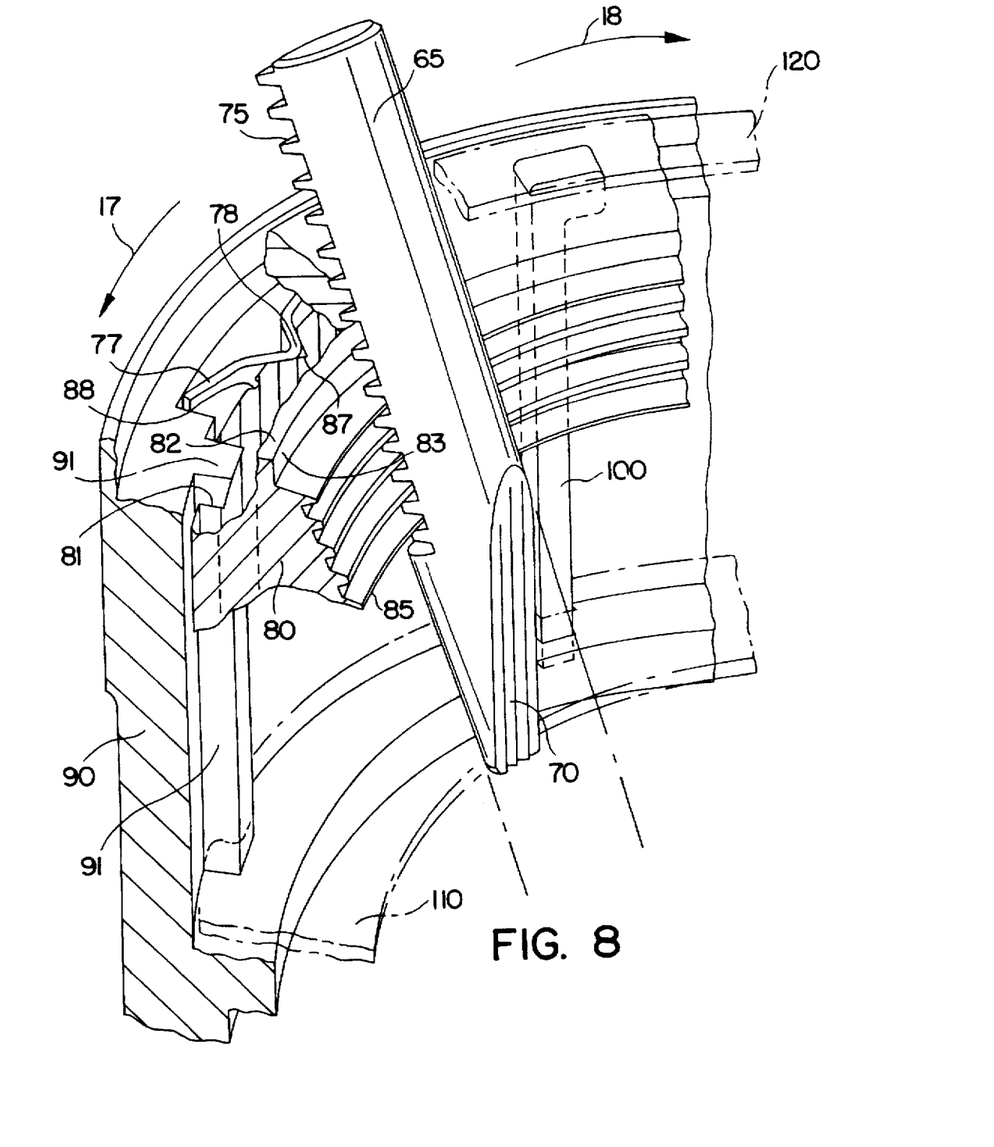
FIG. 8 is an elevated perspective partial view of components of the chuck shown in FIGS. 1–7 and 9.

A plurality of jaws 65 are slidably positioned in each of the angularly disposed passageways 60. As shown in FIGS. 1, 8 and 9, each of the jaws 65 has a face 70 formed on one side thereof for engaging a tool, such as a drill bit shank (not shown), to be held thereby. Each of the jaws 65 also includes threads 75 formed on the side opposite of the jaw faces 70. In accordance with the present invention, the threads 75 on jaws 65 can be relatively coarse if desired.

As shown in FIGS. 1, 8 and 9, a nut or tightening ring 80 with internal threads 85 is rotatably received on body 20 forward of thrust ring 45. Threads 85 on the nut 80 engage threads 75 on the jaws 65 so that when the nut 80 is operated in a tightening direction, the jaws will be moved forward or toward the nose section 25 of the chuck, and when the nut is rotated in a loosening direction, the jaws will be retracted or moved toward the tail section 30 of the chuck. Utilization of relatively coarse threads 75, 85 on the jaws 65 and nut 80, respectively, minimizes the number of rotations of the nut 80 required to move the jaws 65 through their full range of movement.

As shown in FIGS. 1 and 9, a jaw stop flange 220 serves to limit the travel of jaws 65 in the rearward or opening direction. Jaw stop flange 220 is arranged so that jaws 65 will abut the flange in their rearmost position to prevent binding between the jaws and nut 80. While illustrated as unitary with body 20, it should be appreciated that stop flange 220 could be a separate component that is secured to body 20.

Figure 6:
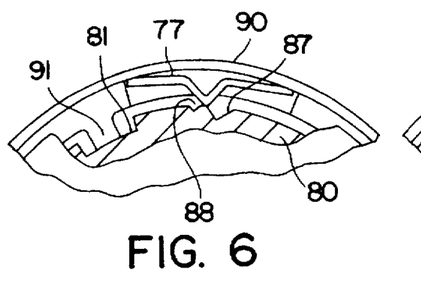
FIG. 6 is a partial exploded view from the perspective of the view taken along the arrows 5, 5 of FIG. 1 with the chuck in a first operative condition.
Figure 7:
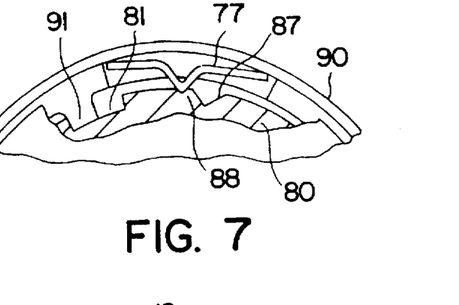
FIG. 7 is a partial exploded view from the perspective of the view taken along the arrows 5, 5 of FIG. 1 with the chuck in a second operative condition.

Nut 80 is preferably a one-piece or unitary nut. Body 20 is of a reduced diameter in the nose section 25 so that nut 80 can be received thereover. While a one-piece nut is preferred, it should be appreciated that a two-piece or broken nut could be utilized and could be held together by a band, the sleeve, spot welding or the like. As shown in FIGS. 6 and 7 for example, nut 80 includes drive dog receiving slots 81 for receipt of drive dogs in the form of ribs 91 located in a sleeve as will be set forth in more detail below.

Referring to FIGS. 1 and 4–9, a sleeve member 90 is illustrated. It should be appreciated that sleeve 90 could be of any known material, such as plastic, metal, or combinations thereof, as well as any suitable composite material. Since sleeve member 90 overlies nose section 25 of body member 20, it also is known as a front sleeve. As shown in FIGS. 1 and 9, sleeve 90 is held in place by a retaining member 94, which is press-fitted to nose section 25 of body member 20. However, it should be appreciated that retaining member 94 could take other forms, such as a spring clip or the like. Retaining member 94 also may serve as a decorative nose piece.

Sleeve 90 is configured and disposed in driving engagement with nut 80 so that when sleeve 90 is rotated with respect to body member 20, jaws 65 will be opened or closed, depending on the direction of rotation of sleeve 90. The driving engagement between sleeve 90 and nut 80 can be by any known arrangement. In one embodiment (not shown), sleeve 90 could be press fitted onto the nut 80 as is well known in the art. In a preferred embodiment shown in FIGS. 5-8 for example, sleeve 90 may include drive dogs in the form of drive ribs 91 that engage drive dog receiving portions in the form of drive slots 81 in nut 80 to rotationally secure sleeve 90 to nut 80. In another embodiment, the drive ribs could be formed in nut 80, while the drive slots could be formed in sleeve 90. Thus, one of nut 80 and sleeve member 90 is configured with a drive rib, and the other of nut 80 and sleeve member 90 is configured with a drive slot that receives the drive rib.

As described above, nut 80 and sleeve 90 are configured and disposed to be selectively rotatable with respect to each other over a limited extent. As shown in FIGS. 5-7 for example, the dimension of drive slots 81 in the circumferential direction is about twice the magnitude of this same dimension of the corresponding drive ribs 91. The difference in these dimensions determines the maximum extent of the relative rotation that can occur between nut 80 and sleeve 90.

In further accordance with the chuck of the present invention, at least one detent is provided for selectively restraining relative rotation between nut 80 and sleeve member 90 over the full extent of the drive slot 81. As shown in FIGS. 5-9 for example, the detent includes at least one groove 87 formed in the exterior surface of nut 80. In addition, each detent includes a resilient retaining clip 77 configured and disposed for selectively engaging a corresponding groove 87. Nut 80 and front sleeve 90 will rotate in unison without relative rotation, provided peak 78 of clip 77 remains within groove 87 formed in nut 80. As nut 80 meets resistance during tightening of the jaws 65 about the shank of a tool inserted into axial bore 55 of chuck 15, continued rotation of sleeve 90 eventually causes peak 78 of clip 77 to move out of groove 87 and thereby render sleeve 90 selectively rotatable with respect to nut 80.

As shown in FIG. 9 for example, each clip 77 is formed by a strip of resilient material defining a peak portion 78 flanked on opposite sides by a wing portion 79. As shown in FIG. 8 for example, groove 87 is configured to receive peak portion of clip 77. As shown in FIG. 9 for example, a cut-out 95 is formed in sleeve 90 and configured to receive each clip 77 and hold each clip therein so that each clip 77 is nonrotatably held by sleeve member 90. However, in an alternative embodiment (not shown), each clip 77 could be held nonrotatably by fitting the free end of each wing portion 79 into a slot formed in sleeve 90. As shown in FIG. 5 for example, three pairs of corresponding grooves 87, clips 77 and cut-outs 95 are symmetrically disposed around the circumferences of nut 80 and sleeve 90. The three pairs are configured and disposed so that all three peaks 78 of clips 77 reside in their respective grooves 87 at the same time.

A chuck in accordance with a preferred embodiment of the present invention also includes a means for increasing the gripping force applied by the jaws 65 of the chuck 15 to the shank of a tool held between the jaws. As embodied herein, a supplemental tightening mechanism is configured and disposed so as to force the nut 80 toward the nose section 25 and thereby cause the jaws 65 to produce an enhanced tightening force on the tool.

Figure 2:
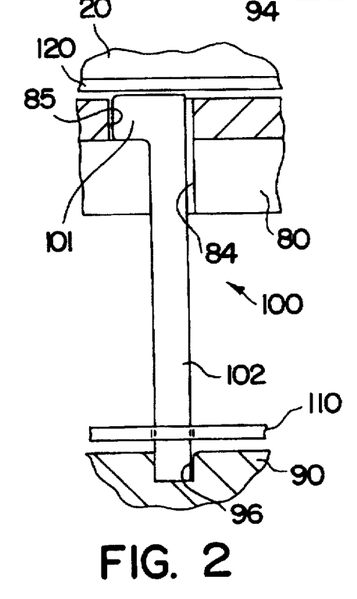
FIG. 2 is a partial cross-sectional view taken along the arrows 2, 2 of FIG. 1 with the chuck in a first operative condition.
Figure 3:
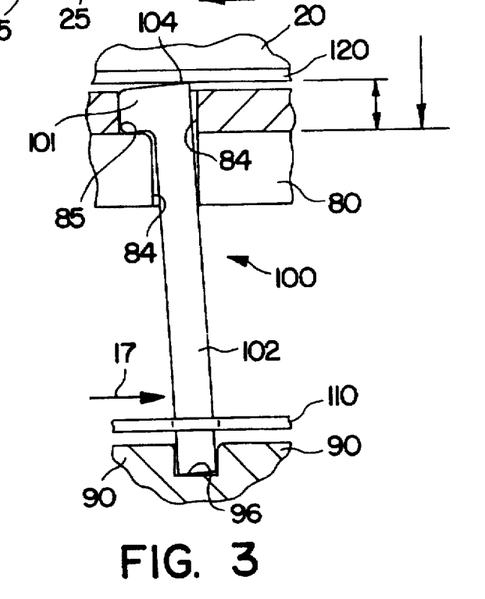
FIG. 3 is a partial cross-sectional view taken along the arrows 3, 3 of FIG. 1 with the chuck in a second operative condition.

As shown in FIGS. 1-5, 8 and 9 for example, the supplemental tightening mechanism includes at least one lever member 100. In the preferred embodiment shown in FIGS. 4 and 5 for example, three lever members 100 are disposed symmetrically at approximately 120 degree intervals around the circumference of chuck 15. As shown in FIGS. 2 and three for example, each lever member 100 is L-shaped and includes a relatively shorter leg 101 and a relatively longer leg 102 disposed at an angle less than 180 degrees with respect to shorter leg 101. As shown in FIGS. 2 and 3 for example, shorter leg 101 extends transversely from one end of longer leg 102 at an angle of about 90 degrees.

As shown in FIGS. 2 and 3 for example, nut 80 includes at least one pathway 84 that is configured and disposed to extend axially through nut 80 to accommodate the passage of at least a portion of a lever member 100 through the at least one pathway 84. As shown in FIGS. 1-3, 8 and 9, the portion of lever member 100 passing through pathway 84 in nut 80 is a portion of longer leg 102 of a lever member 100. A separate pathway 84 is provided in nut 80 for each lever member 100. Moreover, each pathway 84 is provided with a foot recess 85 that is configured to receive shorter leg 101 of each lever member 100. Note that pathway 84 and foot recess 85 are configured to allow some clearance space to exist when lever member 100 is disposed therein so that lever member 100 can be canted within pathway 84 and foot recess 85. In addition, as shown in FIGS. 1-3 and 8 for example, longer leg 102 of lever member 100 forms a portion of the supplemental tightening mechanism that is disposed forward of the nut 80, i.e., between nut 80 and nose section 25 of body member 20.

As shown in FIGS. 1-3 for example, sleeve member 90 includes at least one recess 96, which is configured and disposed to receive one free end of a lever member 100. The free end of the lever member 100 received in recess 96, is the end of longer leg 102 opposite where shorter leg 101 joins with longer leg 102. Because three lever members 100 are included in the embodiment shown, sleeve 90 is provided with three corresponding recesses 96. As shown in FIG. 3 for example, each recess 96 is configured so that the end of lever member 100 received in the recess can be canted within the recess.

Figure 4:
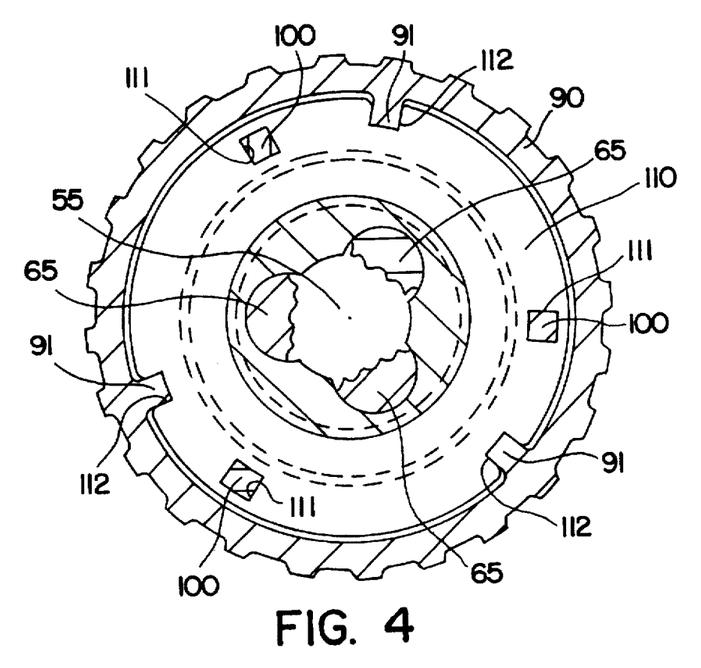
FIG. 4 is a cross-sectional view taken along the arrows 4, 4 of FIG. 1.

As shown in FIGS. 1-4, 8 and 9 for example, the supplemental tightening mechanism includes an actuation ring 110, which is configured and disposed to engage each lever member 100 so as to produce an enhanced tightening force on the tool inserted into the axial bore 55 of the chuck 15. As shown in FIGS. 4 and 9 for example, actuation ring 110 defines a separate opening 111 through which a portion of a lever member 100 passes. As shown in FIG. 4, there is one such opening 111 in the actuation ring 110 for each lever member 100 employed by chuck 15. In addition, as shown in FIG. 4 for example, actuation ring 110 is fixed against rotation with respect to sleeve member 90 by cut-outs 112 configured and disposed to receive respective drive ribs 91 of sleeve 90.

As shown in FIGS. 1-4, 8 and 9 for example, the supplemental tightening mechanism includes a washer 120 disposed between nut 80 and body member 20. Washer 120 is formed of hardened material such as hardened stainless steel. As shown in FIG. 3 for example, washer 120 is disposed to selectively engage a portion of shorter leg 101 of lever member 100, when lever member 100 is canted within pathway 84, foot recess 85 and recess 96. As shown in FIG. 1 for example, thrust ring 45 formed in body member 20 is configured and disposed to receive washer 120, which is press-fitted in a recess formed in the forward-facing surface of thrust ring portion 45 of body 20. The washer 120 eliminates the need to harden the entire body 20.

An explanation of the operation of chuck 15 proceeds as follows. In FIGS. 1 and 8, the jaw 65 depicted therein is disposed in the fully retracted position corresponding to the chuck 15 being fully open for receiving the shank of a tool in axial bore 55. In this condition of chuck 15, lever members 100 are oriented as shown in FIG. 2, and the detents are oriented as shown in FIGS. 5 and 8. Thus, in this fully untightened condition of chuck 15, peak portions 78 of clips 77 are fully received and held in their respective corresponding grooves formed in nut 80.

Upon rotating the sleeve 90 relative to body 20 in a tightening direction, which is indicated by the arrow designated by the numeral 17 in FIG. 8, nut 80 will rotate in unison with sleeve 90. In addition, jaws 65 will be caused to move forward (toward nose section 25 of body 20) until the jaws 65 contact the drill bit shank (not shown). Upon such contact, the shank will be retained within the jaws 65 of the chuck 15. Once jaws 65 exert sufficient gripping force on the tool shank, jaws 65 exert an equal force backward against nut 80. This backward force prevents further rotation of nut 80 with respect to body member 20. It also tends to press nut 80 toward thrust ring portion 45 of body 20 so that the interior surface 83 (FIG. 8) of the rear flange 82 of the nut 80 may press against the facing ledge 23 (FIG. 1) formed on body 20 just forward of thrust ring portion 45.

When the back force exerted by the tightened jaws 65 has resulted in nonrotation between nut 80 and body member 20, further rotation of sleeve 90 in the tightening direction of arrow 17 causes clips 77 to disengage from grooves 87 as shown in FIG. 6. At the same time, because actuation ring 110 is fixed to rotate in unison with sleeve 90, actuation ring 110 pulls against longer legs 102 of lever bars 100 in the direction of arrow 17 shown in FIG. 3. Actuation ring 110 thus causes lever members 100 to become canted within each of pathways 84, foot recesses 85 and sleeve recesses 96, as shown in FIG. 3. Moreover, when each drive rib 91 of sleeve 90 butts against the end wall of each drive slot 81 in nut 80 as shown in FIG. 7, then each lever member 100 is sufficiently canted so that the top surface 104 of shorter leg 101 of lever member 100 presses against washer 120 to push nut 80 forward toward nose section 25 of body 20. The top surface 104 of each lever member 100 is caused to be pivoted with washer 120 acting as the fulcrum, so that nut 80 moves forwardly toward the nose section 25 of body member 20 and thereby provides additional tightening force through jaws 65 by virtue of the axial force placed on nut 80. This levered movement of nut 80 provides the supplemental gripping force applied by jaws 65 against the shank of the tool being held by the chuck 15.

In addition, as shown in FIG. 7 for example, as the supplemental gripping force is actuated as described above, peak portion 78 of clip 77 becomes held in a notch 88 formed in the exterior surface of nut 80. A separate notch 88 is provided for each clip 77. These notches 88 permit the detents to hold sleeve 90 in this supplemental tightening condition until the operator moves sleeve 90 in the loosening direction indicated in FIG. 8 by the designating numeral 18.

In summary, as the primary tightening mechanism is actuated (i.e., rotation of nut 80 with respect to jaws 65), the jaw and nut arrangement is pre-loaded in the rearward direction. Thereafter, actuation of the supplemental tightening mechanism is effective to enhance the overall holding force of the chuck.

When it is desired to release the drill bit or tool being held by the jaws, sleeve 90 is rotated in a release direction, which is opposite of the tightening direction and indicated in FIG. 8 by the arrow designated 18. Rotation of sleeve 90 in a release direction retracts jaws 65 rearwardly into the chuck to release the tool being held thereby.

In a preferred embodiment, sleeve member 90 extends to cover the full length of body member 20, thus eliminating the need for a rear sleeve. However, in an embodiment shown in FIGS. 1 and 9 for example, a rear sleeve 135 may be provided. In such embodiments, a plurality of axially extending splines 155 are formed in the exterior surface of thrust ring portion 45 of body member 20, and rear sleeve 135 is retained in a nonrotatable manner on tail section 30 of body member 20 by being press-fitted onto splines 155 in thrust ring portion 45 of body 20. It should be appreciated that any suitable type of retaining member could be utilized, such as, for example, a spring clip.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a) a generally cylindrical body member having a nose section and a tail section, said tail section adapted to mate with the drive shaft of the driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof for engaging a tool to be held thereby, and threads formed on the opposite side thereof for engagement with a nut;
   c) a nut rotatably mounted with respect to said body member and in engagement with said threads on said jaws;
   d) a sleeve member in driving engagement with said nut so that when said sleeve member is rotated with respect to said body member, said jaws will be moved thereby; and
   e) a supplemental tightening mechanism configured and disposed so as to force said nut toward said nose section and thereby cause said jaws to produce an enhanced tightening force on the tool, said mechanism including a portion disposed between said nut and said nose section of said body member wherein said supplemental tightening mechanism includes at least one lever member.

2. A chuck for use with a manual or powered driver as in claim 1, wherein said at least one lever member is L-shaped.

3. A chuck for use with a manual or powered driver as in claim 2, wherein said L-shaped lever member includes a relatively shorter leg and a relatively longer leg disposed at an angle less than 180 degrees with respect to said relatively shorter leg.

4. A chuck for use with a manual or powered driver as in claim 2, wherein a portion of said L-shaped lever member forms said portion of said supplemental tightening mechanism disposed between said nut and said nose section of said body member.

5. A chuck for use with a manual or powered driver as in claim 1, wherein said supplemental tightening mechanism includes an actuation ring configured and disposed to engage said lever member so as to produce an enhanced tightening force on the tool.

6. A chuck for use with a manual or powered driver as in claim 5, wherein a portion of said lever member passes through a portion of said actuation ring.

7. A chuck for use with a manual or powered driver as in claim 5, wherein said actuation ring is fixed against rotation with respect to said sleeve member.

8. A chuck for use with a manual or powered driver as in claim 1, further comprising a washer disposed between said nut and said body member.

9. A chuck for use with a manual or powered driver as in claim 8, wherein said washer is formed of hardened material and is disposed to selectively engage a portion of said lever member.

10. A chuck for use with a manual or powered driver as in claim 9, further comprising a thrust ring formed in said body member wherein said thrust ring is configured and disposed to engage said washer.

11. A chuck for use with a manual or powered driver as in claim 1, wherein said sleeve member includes at least one recess, said recess receiving one end of said at least one lever member.

12. A chuck for use with a manual or powered driver as in claim 11, wherein said one end of said lever member received in said at least one recess is disposed between said nut and said nose section of said body member.

13. A chuck for use with a manual or powered driver as in claim 1, wherein said nut is configured and disposed to be selectively rotatable with respect to said sleeve member.

14. A chuck for use with a manual or powered driver as in claim 1, further comprising a detent for selectively restraining said nut from rotation relative to said sleeve member.

15. A chuck for use with a manual or powered driver as in claim 14, wherein said detent includes at least one groove formed in said nut.

16. A chuck for use with a manual or powered driver as in claim 1, wherein said nut includes at least one pathway extending axially through said nut.

17. A chuck for use with a manual or powered driver as in claim 16, wherein said lever member is disposed so that at least a portion of said lever member extends through said at least one pathway.

18. A chuck for use with a manual or powered driver having a rotatable drive shaft, said chuck comprising:
a) a generally cylindrical body member having a nose section and a tail section, said tail section adapted to mate with the drive shaft of the driver and said nose section having an axial bore formed therein and a plurality of angularly disposed passageways formed therethrough and intersecting said axial bore;
b) a plurality of jaws slidably positioned in each of said angularly disposed passageways, each of said laws having a jaw face formed on one side thereof for engaging a tool to be held thereby, and threads formed on the opposite side thereof for engagement with a nut;
c) a nut rotatably mounted with respect to said body member and in engagement with said threads on said jaws;
d) a sleeve member in driving engagement with said nut so that when said sleeve member is rotated with respect to said body member, said jaws will be moved thereby; and
e) a supplemental tightening mechanism configured and disposed so as to force said nut toward said nose section and thereby cause said jaws to produce an enhanced tightening force on the tool, said mechanism including a portion disposed between said nut and said nose section of said body member, wherein said nut is configured and disposed to be selectively rotatable with respect to said sleeve member and wherein one of said nut and said sleeve member is configured with a drive rib and the other of said nut and said sleeve member is configured with a drive slot receiving said drive rib.

19. A chuck for use with a manual or powered driver having a rotatable drive shaft, said chuck comprising:
a) a generally cylindrical body member having a nose section and a tail section, said tail section adapted to mate with the drive shaft of the driver and said nose section having an axial bore formed therein and a plurality of angularly disposed passageways formed therethrough and intersecting said axial bore;
b) a plurality of jaws slidably positioned in each of said angularly disposed passageways, each of said jaws having a jaw face formed on one side thereof for engaging a tool to be held thereby, and threads formed on the opposite side thereof for engagement with a nut;
c) a nut rotatably mounted with respect to said body member and in engagement with said threads on said jaws;
d) a sleeve member in driving engagement with said nut so that when said sleeve member is rotated with respect to said body member, said jaws will be moved thereby: and
e) a supplemental tightening mechanism configured and disposed so as to force said nut toward said nose section and thereby cause said jaws to produce an enhanced tightening force on the tool, said mechanism including a portion disposed between said nut and said nose section of said body member, further comprising a detent for selectively restraining said nut from rotation relative to said sleeve member wherein said detent includes a resilient retaining clip held nonrotatably by said sleeve member.

* * * * *

UNITED STATES PATENT AND TRADEMARK OFFICE
CERTIFICATE OF CORRECTION

PATENT NO. : 5,775,704
DATED : July 7, 1998
INVENTOR(S) : Wilson et al.

It is certified that error appears in the above-identified patent and that said Letters Patent is hereby corrected as shown below:

In Column 2, Line 15, please start a new paragraph with the words "To achieve the objects and in".

In Claim 18, Column 9, Line 54, please change "laws" to --jaws--.

Signed and Sealed this

Eighteenth Day of May, 1999

Attest:

Q. TODD DICKINSON

Attesting Officer     *Acting Commissioner of Patents and Trademarks*